Feb. 6, 1962    C. V. SWANSON, JR., ETAL    3,020,528
TOILET TRAINING APPARATUS
Filed April 20, 1959    2 Sheets-Sheet 1
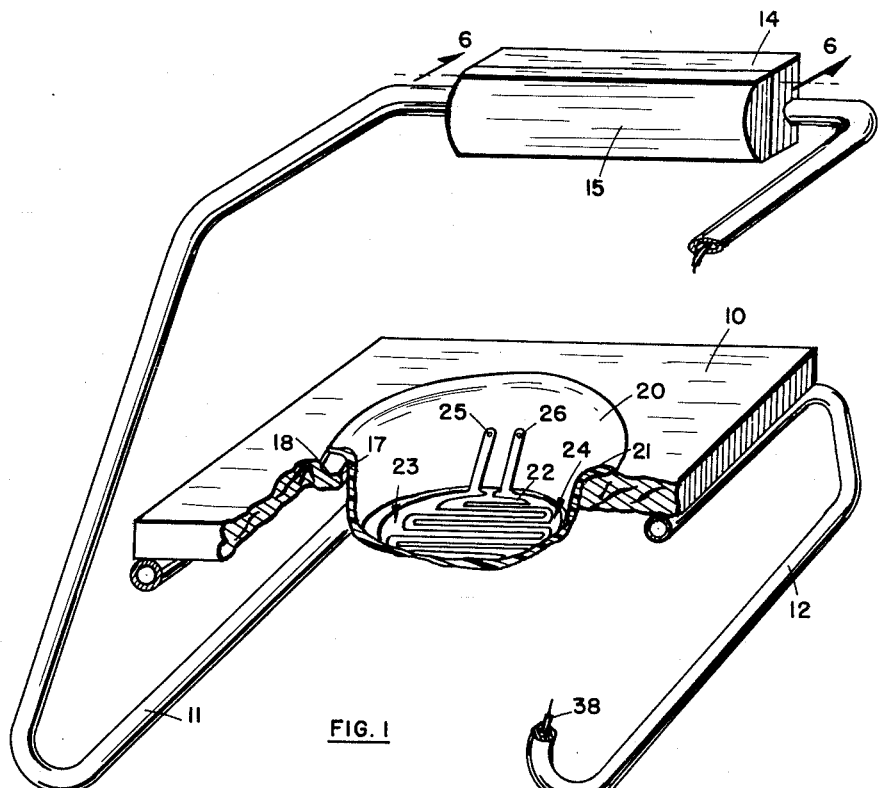
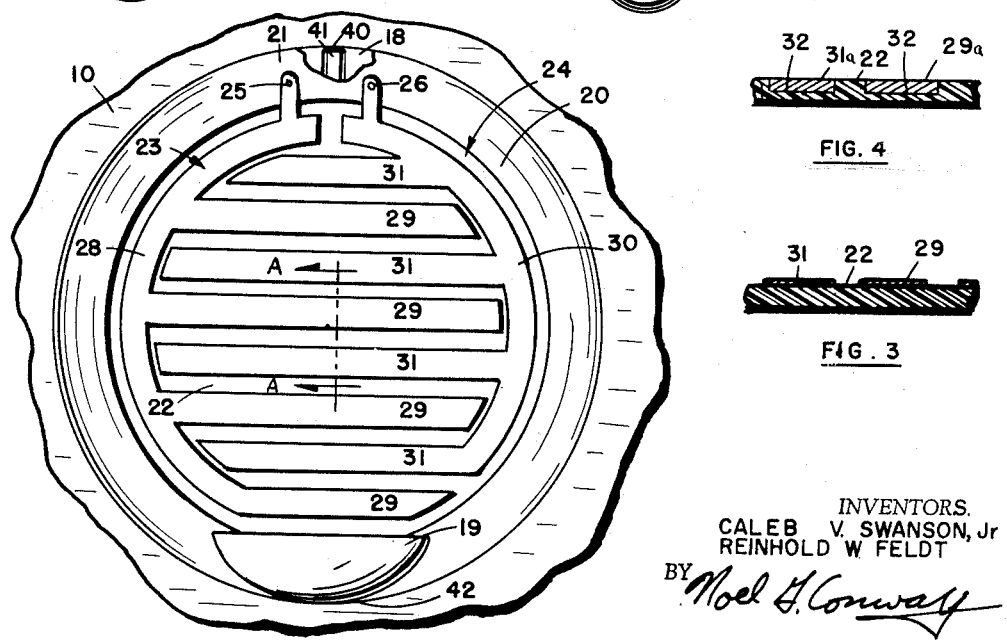
INVENTORS.
CALEB V. SWANSON, Jr
REINHOLD W. FELDT
BY Noel H. Conway
ATTORNEY Feb. 6, 1962   C. V. SWANSON, JR., ETAL   3,020,528
TOILET TRAINING APPARATUS
Filed April 20, 1959
2 Sheets-Sheet 2
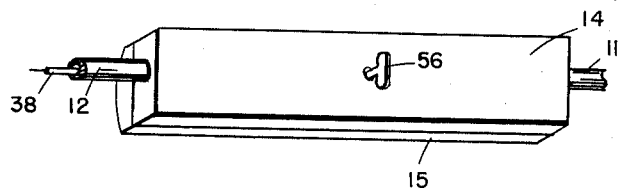
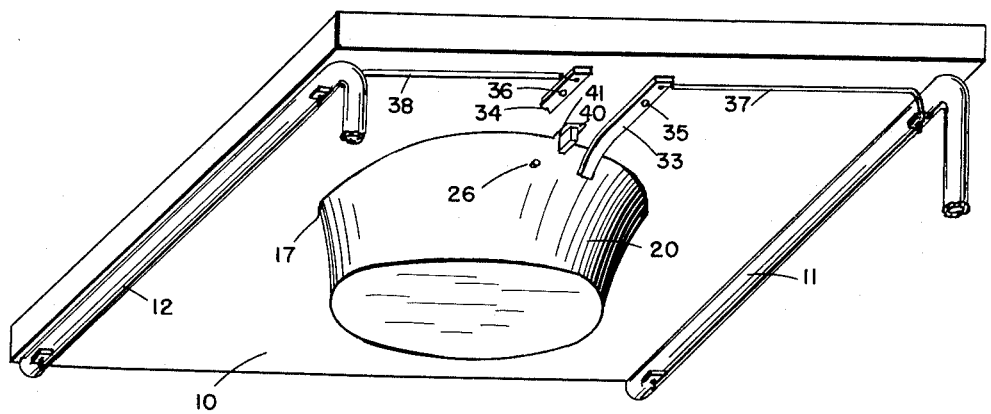
FIG. 5
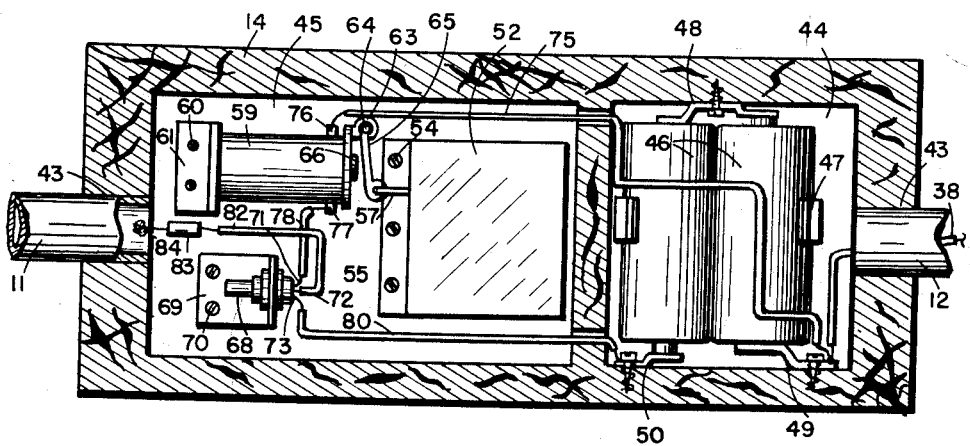
FIG. 6
INVENTORS.
CALEB V. SWANSON, Jr.
REINHOLD W. FELDT
BY *Noel H. Conway*
ATTORNEY

United States Patent Office 3,020,528
Patented Feb. 6, 1962

3,020,528
TOILET TRAINING APPARATUS
Caleb V. Swanson, Jr., Redondo Beach, and
Reinhold W. Feldt, Santa Monica, Calif.
Filed Apr. 20, 1959, Ser. No. 807,398
4 Claims. (Cl. 340—235)

This invention relates to a toilet training apparatus and more particularly to a training apparatus which produces pleasing sounds at proper times in order to encourage the toilet training of the child.

More particularly this invention is related to a training apparatus which has means mounted in the bottom of the container of the training apparatus for controlling the operation of a music producing device in response to the presence of waste products in the trainer container.

More particularly this invention relates to a child training device having an improved means for sensing the presence of waste products of the child in the apparatus and having means to produce a signal sufficiently large to actuate a musical device.

For many months in the first part of his life an infant has no control over the time at which he excretes his waste products. Such inopportune excretions cause interruptions to the household routine and therefore his parents desire to encourage the child to use a toilet at the earliest possible age. However such training requires patience and perseverance in order to indoctrinate the child enough so that he will use the toilet when necessary. It is known that infants may be trained more rapidly if they are given some sort of a reward for any act that they do. Therefore, it has been proposed in the past that the "potty" or training apparatus which the child uses be so constructed that some sort of a signal be emitted upon excretion of the waste products. However, such devices have never become commercially accepted because they are unsanitary and unreliable. In one such device the weight of the excretion trips a lever which actuates a musical device. However, such weight sensitive structure is quite complicated and any waste products which splash out of the container land on the levers and assorted complicated equipment which are very hard to clean. Since the training apparatus is used many times a day the cleaning chore would rapidly become too much of a burden for the parent. Further, the tired parent would undoubtedly soon fail to clean properly and the resulting foul odor and unsanitary conditions could cause her to discard the apparatus entirely. Possibly even more important is the adverse effect on the child using the apparatus. Quite often the amount of excretion from the child is only a few drops and such weight actuated devices are not sensitive enough to respond to this small amount of waste products. Apparatus which will not work every time is practically useless for training purposes. Further, if the child gets the idea that the downward movement of the container will cause the music to play he may push down on the bottom of the container covered with waste products with his hands with the obvious disagreeable effects. Toilet apparatus also has been suggested in the past which depends upon the fact that urine is an excellent electrical conductor. However, such prior toilet apparatus was unreliable and was not sensitive to the presence of solid feces without the use of means such as a weight actuated lever which made the bowl impossible to maintain in a sanitary condition.

The resistance of solid feces is very high and therefore only a very minute current may be conducted through such solid feces unless high voltages are impressed across the conducting means in the bottom of the container of the toilet apparatus. At best such voltages are unsatisfactory since the child is very sensitive to shocks which would cause him to avoid the use of the training device. Further, there is the possibility that a malfunction might cause the apparatus to become actually dangerous if such high voltages were used. The present invention is so constructed that while it depends upon the ability of the waste products to conduct electricity, the current through the waste products is very minute. More specifically the present invention provides power means electrically connected to a sound making device to actuate the device when the current of this actuating circuit exceeds a predetermined level. However, means in the form of a transistor, is incorporated in this circuit which is able to vary the resistance of and thereby control the current through this circuit. A transistor, as presently connected, exhibits an extremely high resistance between the emitter and collector terminals. However, in the present apparatus, if the potential of the base terminal becomes lower, i.e., approaches ground potential then the resistance between the emitter and collector terminals and therefore in the actuating circuit, is greatly diminished and approaches zero. Therefore, a first side of the conducting means which senses the presence of waste products in the container of the apparatus is connected to the base of the transistor while the other, or second side of the conducting means is connected to ground potential. Thereby, it is seen that in the present invention, the waste products are used only for the purpose of lowering the potential of the first side of the conducting means, whereby this apparatus does not require the high voltages necessary to pass sufficient current through solid waste products to actuate some sound producing device.

Another important feature of the present invention is the particular construction of the conducting means which is mounted in the bottom of the waste products receiving container to sense the presence of waste products. These conducting means are so constructed that it is very certain that any waste products excreted will form a conducting path between the conducting means. Further, the conducting means are so constructed that they do not project above the upper surface of the bottom of the container. Such structure makes the present apparatus easy to clean and further, makes it very reliable in order that there will always be the desired rewarding sound to the child at the proper time. These salient advantageous qualities have caused the present invention to be accepted and desired by both parent and child alike.

Therefore it is an object of this invention to provide a child training apparatus.

It is a further object of this invention to provide a child training apparatus which is actuated by the excretions in order to produce pleasant sounds.

It is a further object of this invention to provide a child training apparatus which has conducting means in the bottom of the container of the apparatus which are substantially flush with the bottom of the container.

It is a further object of this invention to provide a child training apparatus which will be actuated by a minute current flowing through solid waste products in order to produce pleasing sounds to the user.

Other and further objects of this invention will become apparent in the detailed description below wherein:

FIG. 1 shows a partially cutaway pictorial view of the training apparatus;

FIG. 2 shows a detailed plan view of the container of the present apparatus;

FIG. 3 shows a partial cross sectional view of the bottom of the container in FIG. 2;

FIG. 4 shows a partial cross sectional view of the container in FIG. 2;

FIG. 5 shows a partial pictorial rear view of the apparatus as seen from below; and, FIG. 6 shows a cross section view of the backrest of the training apparatus and shows the electrical portion of the present invention.

FIG. 1 shows one form which the invention might take. As seen seat 10 is mounted to tubular members 11 and 12 which are bent in such manner that both the seat 10 and backrest 14 resiliently support the child. The backrest 14 has a removable cover 15 in order that one may gain access to the electrical apparatus which will be described in more detail below. As can be seen the seat 10 has an aperture 17 formed in it with a recessed counterbore 18 formed around the aperture 17. An open top container 20 having a radially extending lip 21 is located in the aperture 17 as shown. The container 20 which is made of plastic may be constructed of some other non-conducting material as desired or it may be made of some conducting material. However, the container must contain some means to insulate the two conductors of the conducting means from each other in the latter case. In the present embodiment a first conductor element indicated generally by the arrow 23 and a second conductor element indicated generally by the arrow 24 are provided mounted in the bottom 22 and extend up the rear side of the container and terminate in the terminals 25 and 26 respectively.

As shown in the plan view of the container 20, FIG. 2, a deflector in the form of cup 19 is mounted on the lip 21. This cup 19 may be permanently attached to the lip 21 or it may be removably mounted thereon by means such as a spring clip which slips over the lip 21. FIG. 2 also discloses a preferred form that the conducting means may take. First conductor 23 has a main portion 28 extending adjacent to the side wall of the container for nearly one half of the perimeter of the side wall. A plurality of secondary portions 29 extend from the main portion 28 in a parallel direction nearly all of the way across the bottom 22. Similarly, second conductor 24 has a main portion 30 extending adjacent the side wall of the container opposite the main portion 28 of the first conductor 23 for nearly one half of the perimeter of the side wall of the container 20. A plurality of secondary portions 31 extend from the main portion 30 across the bottom 22 as shown and terminate adjacent the main portion 28. As can be seen the secondary portions 29 and 31 are spaced apart a predetermined distance and are spaced alternatively on the bottom 22 covering a substantial portion of the bottom. With this configuration almost any small amount of waste products will close the circuit between the conductor 23 and conductor 24 to control the electrical circuitry, which will be described below, in order to produce a pleasing sound to the infant. Two forms which the conductors 23 and 24 may take are disclosed in detail in FIG. 3 and FIG. 4 which are cross-section views of the bottom 22 taken along line A—A. These figures show in detail an important feature of the conducting means; that is, that the conducting means must be substantially flush with the bottom 22 of the container 20 in order to allow the container to be easily cleaned.

In FIG. 3 the conducting means take the form of a 0.001 in. layer of metallic paint which is painted on the bottom 22 of the container 20 in the portions shown in FIG. 2. This metallic paint may be silver, copper or any other conducting paint which is commercially available. For illustrative purposes the secondary portions 29 and 31 shown in FIG. 3 appear to project above the upper surface of the bottom 22. However, in actual practice they only project approximately 0.001 in. which is substantially flush with the upper surface of the bottom 22 whereby the container may be easily cleaned.

FIG. 4 shows an alternative conducting means wherein the bottom 22 has recesses 32 located in it. In this embodiment secondary portions which are designated 31a and 29a are molded into the recesses with the upper surface of the secondary portions substantially flush with the upper surface of the bottom 22. In this case the conducting means are stamped out of a light gauge easily formable metal such as copper. Then the conducting means are mounted in the mold which is used to shape the container 20, and material, such as powdered molding plastic is inserted into the mold. Heat is then applied to cause the plastic to take the proper shape. Alternatively the recesses 32 may be formed in the bottom 22 and the conducting means are then attached in the recesses by some suitable means such as cement.

As shown in FIG. 5 spring contacts 33 and 34 are mounted to the bottom of the seat 10 by means of screws 35 and 36 respectively. These spring contacts 33 and 34 are bent downwardly in order that they may resiliently engage the terminals 25 and 26 when the container 20 is in its operating position in the seat 10. Although terminal 25 cannot be seen in this figure spring contact 34 has been cut away to show terminal 26. Wires 37 and 38 are provided to communicate the conducting means with the other electrical means which will be described in detail below. It should be noted that wire 37 is electrically connected to the tubular member 11 at one of the bolts which is used to attach the tubular member to the seat 10. Thereby, tubular member 11 provides a conductor path from the conducting means to the electrical circuitry in the backrest 14 while wire 38 which extends through the center of tubular member 12 provides the other conductor path to the electrical circuitry. In order that the container 20 will be correctly aligned so that the terminals 25 and 26 will be contacted by the spring contacts 33 and 34 respectively, a slot 40 is provided in the seat 10 to receive rigid projection 41 provided on the container 20. With this structure the container 20 may be taken out of its operating position in seat 10 and washed and otherwise easily cleaned. Then the container may be easily re-installed in its operating position by locating the projection 41 in the slot 40 and pushing the container rearwardly relative to the seat so that the forward portion 42 of the lip 21 (FIG. 2) will be engaged by the edge of the recessed counterbore 18 and will hold the terminals 25 and 26 against the spring contacts 33 and 34 respectively.

FIG. 6 shows a detailed view of the electrical circuitry which is mounted in the backrest 14. As can be seen the tubular members 11 and 12 project into bores 43 where they are rigidly held by some suitable means such as a setscrew. The backrest 14 has two cavities 44 and 45 therein. In cavity 44 a power source taking the form of two flashlight batteries 46 which are held in spring clip 47 is provided. These batteries are connected in series by means of the spring contact 48 and the two sides of the power source electrically engage B— or ground spring terminal 49 and B+ spring terminal 50 respectively as shown. A sound making device 52 such as a commercially available music box is mounted in the cavity 45 by means of screws 54 passing through mounting flange 55. In this embodiment the sound making device is of the type which is driven by a spring within it which is manually wound by a key 56 (shown in FIG. 5) which projects through the rear of the backrest 14 where it is easily accessible by the parent. Actuating shaft 57 is slidably mounted as shown and extends into the container of device 52 where it is resiliently urged towards the right hand position shown by means of a spring mounted internally of the container of device 52. In this position the end of the shaft engages the music emitting mechanism within the container of device 52 and prevents it from being operated by the aforementioned spring. When the shaft 57 is moved to the left hand position the end of the shaft moves out of the path of the music mechanism whereby the spring will drive the mechanism and generate music. In order to cause the sound making device 52 to operate at the desired times inductance means for producing a mechanical actuation in response to an electrical input in the form of solenoid 59 operating in conjunction with shaft 57, is provided. Solenoid 59 is mounted adjacent the sound making device 52 by means of screws 60 passing through mounting flange 61 into the backrest 14. The solenoid 59 has a flange 63 extending as shown with a rigid pin 64 projecting at a right angle to the flange 63 forming an axle about which actuating arm 65 mounted on the pin 64 may move. With this structure it can be seen that when the solenoid 59 is energized and the actuating arm 65 is pulled toward the core 66 of the solenoid, the shaft 57 is moved to the left hand position where the mechanism in the sound making device 52 is released so that music is emitted. The solenoid 59 is connected to the power means and to means which is provided for controlling the amount of current flowing through the solenoid 59. In order to control the current through the solenoid, transistor 68 is mounted to the flange 69 which in turn is mounted to the backrest 14 by means of screws 70.

It has been found that, practically speaking, a transistor is the only suitable means for this purpose. This is because the toilet apparatus must be compact, rugged and inexpensive to build, as well as have the necessary reliability and sensitivity in order to be commercially accepted. The present apparatus which incorporates a transistor to control the current to the switch which actuates the sound making device has these characteristics. More specifically the transistor, used as will be described, only requires the use of relatively inexpensive low voltage power such as flash light batteries in order to cause the toilet apparatus to be sufficiently sensitive to actuate when only solid feces is deposited in the container 20. During normal use the training apparatus is moved quite often and is handled in a rough manner by the parent and the child. Here again a transistor furnishes the best current controlling means since it is insensitive to shocks and has no moving parts which may become jammed or otherwise inoperative due to such care. Therefore, the present apparatus will work reliably for a long period of time as required. Further, transistors which are capable of controlling the relatively large current flow through solenoid 59 have the additional advantage that they are inexpensive, which enables the apparatus having sufficient sensitivity to be produced at a cost at which the commercial acceptance is assured.

In this embodiment transistor 68 is of the P-N-P type and has collector terminal 71, base terminal 72, and emitter terminal 73 projecting from it to receive the appropriate wires. One side of the solenoid is connected to the ground terminal of the power source by means of wire 75 which connects the ground terminal 49 with the solenoid terminal 76. The other side of the solenoid 59, i.e., terminal 77, is connected to the collector terminal 71 by means of wire 78. Wire 80 is provided connecting the emitter terminal 73 with the B+ terminal 50 whereby the solenoid 59 and the transistor 68 are connected in series with the power source, i.e., batteries 46. As can be seen the conducting means in the container 20 are connected to the above described electrical circuit. More specifically wire 38, which communicates with the second conductor 24, is connected to the ground terminal 49. Further, as mentioned above, the tubular member 11 is electrically connected with the first conductor 23 via the spring contact 33 and wire 37, and therefore the tubular member 11 is electrically connected with the base terminal 72 through wire 82 and overload resistor 83 which is soldered to the tubular member 11 at junction 84.

Alternatively tubular member 12 could be used as a conductor in the same manner as member 11 by connecting wire 38 to the lower end of member 12, similarly to the manner in which wire 37 is attached to member 11, and electrically connecting the upper end of member 12 to the terminal 49. This embodiment of the invention is particularly useful in demonstrating the present apparatus to prospective parent buyers and to the prospective child user. More specifically, due to the sensitivity of the present invention, the music device may be caused to operate by firmly gripping the tubular members 11 and 12, each of which is a conductor. This is because a sufficient conducting path is provided between the base terminal 72 and the ground terminal 49 through the body of the person gripping the tubular members. Thereby, a very effective demonstration may be made to the potential purchaser, by the sales person merely firmly gripping the arms of the chair in order to cause the music device to be actuated. The parent also finds this modification useful in teaching the child that the music will be played if the child does the right thing. The apparatus may be adjusted so that the music device will not be actuated when the child merely rests his arms on the tubular numbers 11 and 12. This is because the resistance of the conducting path furnished by the child is much higher when there is no firm contact between the child's arms and the tubular members than in the case where said members are gripped firmly. Alternatively, the tubular members may be provided with an insulated coating or arm rests at the portions where the child normally places his arms while seated on the apparatus. Such structure has the advantage that the sensitivity of the apparatus does not have to be adjusted to within a certain range as in the case of the modification mentioned immediately above.

With the structure set forth above it is seen that the apparatus will have an operation as follows. When the container 20 is clean before use, the transistor 68 effectively prevents any current from flowing through the electrical circuit containing solenoid 59 by providing an almost infinite resistance between the collector and emitter terminals 71 and 73. Then when the child excretes the waste products, the waste products complete a circuit from the first conductor 23 to the second conductor 24. At this time base terminal 72 will be connected to the ground terminal 49 and the potential of the base terminal will become lower. By the inherent structure of the transistor 68, when the potential of the base terminal 72 becomes lower, i.e., becomes negatively biased with respect to the emitter terminal 73, the resistance between the collector terminal and the emitter terminal 71 and 73 is reduced to practically zero allowing the power source to pass a large current through the solenoid 59. This causes the solenoid 59 to be actuated which in turn releases the internal mechanism of the sound device 52 allowing it to be driven by the spring and play. It is important to note that it is the lowering of the potential of the base which diminishes and effectively eliminates the resistance between the terminals 71 and 73 in order to allow the power source to pass the activating current through the solenoid 59. Therefore, the waste products merely connect the base to ground in order to allow the potential of the base to become lower, and the minute current through them is important only in that it causes the base potential to lower. Therefore, the sound making device will be actuated even though the resistance of the waste products is extremely high as in the case of solid feces. With the structure thus provided the present training apparatus is able to operate reliably with solid waste produces as well as liquid, and will do this without the necessity of means such as levers or other weight sensitive device obstructing the interior of the container.

While certain features of the present invention have been described and disclosed in detail it should be understood that such is by way of illustration only and that various changes may be made in the various details of construction without departing from the spirit of the invention which should be limited only to the scope of the appended claims.

We claim:

1. A child toilet apparatus comprising a seat member having an opening formed through it, an open top container located in said opening, conducting means located on the bottom of said container, said conducting means including a first conductor and a second conductor insulated from each other and having their upper surfaces substantially flush with the upper surface of the bottom of said container, a backrest mounted to said seat member, said backrest having a spring driven sound making device mounted in it having a solenoid operated switch for actuating the device when the solenoid is energized, a key for winding the spring being mounted to the spring and extending out of the rear of said backrest, power means having two output terminals connected to said solenoid switch to energize said solenoid, and transistor means having a plurality of terminals connected in series with said power means and solenoid for controlling the current through said solenoid, one terminal of said transistor means being connected to said first conductor, said second conductor being connected to one terminal of said power means, whereby said transistor means permits current to flow through said solenoid when solid waste products form a conducting path bewteen said first and second conductors.

2. A child training apparatus comprising: a frame including first and second spaced metal members mounted to a seat member having an aperture formed therein; an open top container mounted in said aperture, the bottom of said container being non-conducting; conducting means mounted on the bottom of the container, said conducting means including a first and a second conductor which are insulated from each other, said conductors being formed by a film of conducting material coated on the bottom, the coating of conducting material being very thin whereby the upper surface of each conductor is substantially flush with the upper surface of the container bottom; means electrically connecting said first and second conductors to said first and second metal members respectively; a backrest mounted to said metal members; a sound making device having a solenoid actuated switch means for actuating it; power means for passing current through the solenoid, and transistor means, for controlling the current flow through the solenoid, being connected in series with said solenoid; said transistor means having a terminal, the potential of which controls the current flow through the solenoid, said transistor terminal being connected to said first metal member; said power means having two terminals, one of which is connected to said second metal member.

3. A child toilet apparatus comprising:
a seat member having an opening formed through it;
an open top container located in said opening;
conducting means located on the bottom of said container, said conducting means including a first conductor and a second conductor insulated from each other and having their upper surfaces flush with the upper surface of the bottom of said container;
a control box connected to said seat member, said control box having a spring driven sound making device mounted in it having a solenoid operated switch for actuating the device when the solenoid is energized;
a key for winding said spring being mounted to said spring and extending out of the rear of said control box;
power means having two output terminals connected to said solenoid switch to energize said solenoid;
and transistor means having a plurality of terminals connected in series with said power means and solenoid for controlling the current through said solenoid, one terminal of said transistor means being connected to said first conductor, said second conductor being connected to one terminal of said power means, whereby said transistor means permits current to flow through said solenoid when solid waste products form a conducting path between said first and second conductors.

4. A child training apparatus comprising: a frame including first and second spaced metal contact members mounted to a seat member having an aperture formed therein; an open top container mounted in said aperture, the bottom of said container being non-conducting; conducting means on the bottom of the container, said conducting means including a first and a second conductor which are insulated from each other, the upper surface of each conductor being substantially flush with the upper surface of the container bottom; means electrically connecting said first and second conductors to said first and second metal contact members respectively; a sound making device connected to said seat member having inductance means for actuating it; power means for passing current through the inductance means; and transistor means for controlling the current flow through the inductance means, said transistor means being connected in series with said inductance means and power means, said transistor means having a terminal, the potential of which controls the current flow through the inductance means, said transistor terminal being connected to said first metal contact member; said power means having two terminals, one of which is connected to said second metal contact member.

References Cited in the file of this patent

UNITED STATES PATENTS

| | | |
|---|---|---|
| 2,127,538 | Seiger | Aug. 23, 1938 |
| 2,628,665 | Orlando | Feb. 17, 1953 |
| 2,663,861 | Heath | Dec. 22, 1953 |

FOREIGN PATENTS

| | | |
|---|---|---|
| 580,507 | Great Britain | Sept. 10, 1946 |
| 530,319 | Italy | July 8, 1955 |

OTHER REFERENCES

Garner Text, Transistor Circuit Handbook, pages 286–290, published 1956.